United States Patent Office 3,308,278
Patented Mar. 7, 1967

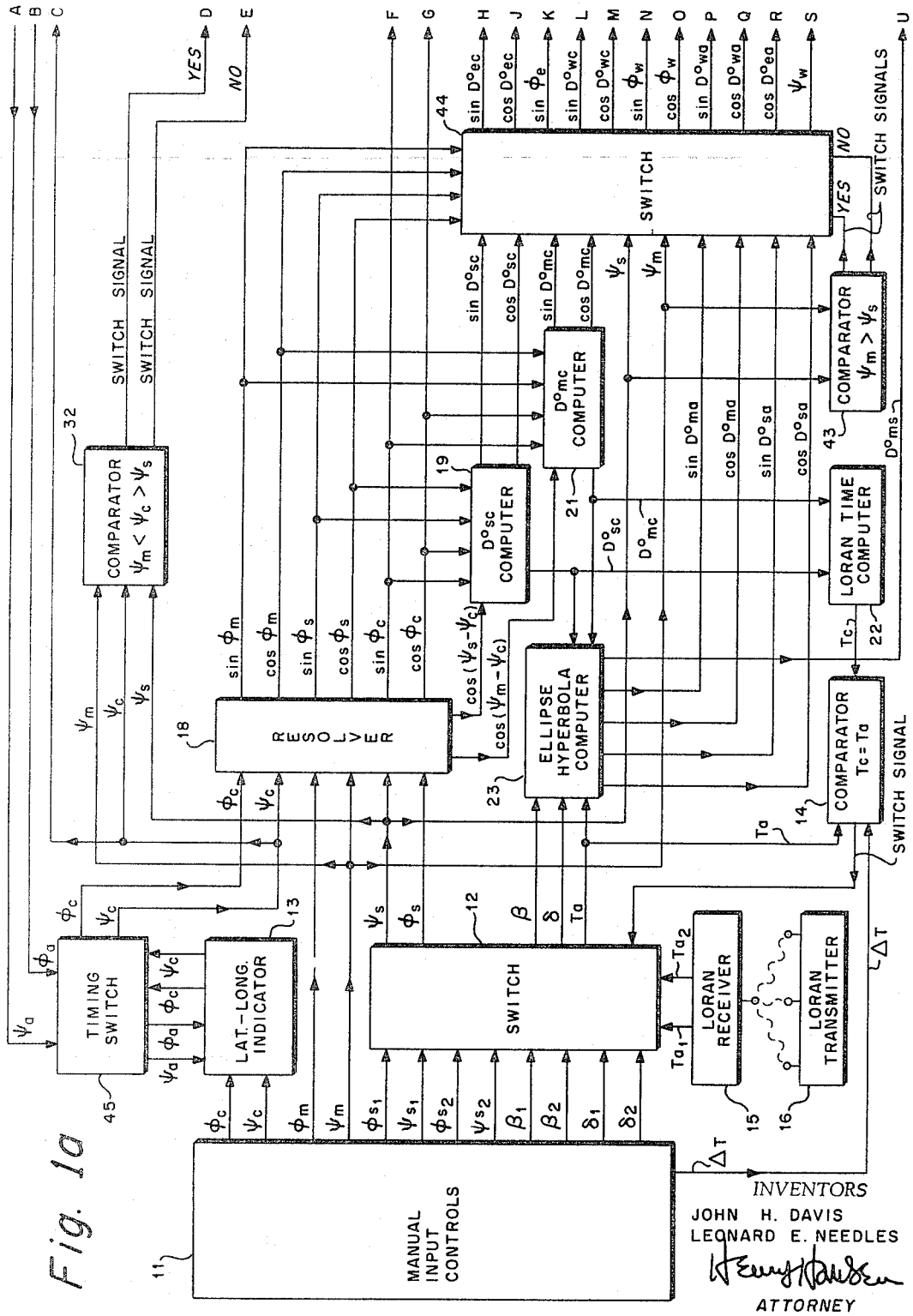

3,308,278
LATITUDE-LONGITUDE COMPUTER
John H. Davis, Hatboro, and Leonard E. Needles, Churchville, Pa., assignors to the United States of America as represented by the Secretary of the Navy
Filed Feb. 26, 1963, Ser. No. 261,236
11 Claims. (Cl. 235—150.27)

The invention herein described may be manufactured and used by or for the Government of the United States of America for governmental purposes without the payment of any royalties thereon or therefor.

This invention relates to a computer and more particularly to a navigation computer providing continuous indications of present longitude and latitude of an aircraft.

Various methods for determining aircraft position are in use today. The most common of these methods is the conventional dead reckoning method. As is well known, however, dead reckoning methods of navigation and present position determination are vulnerable to various possibilities for error. Another method for determining present aircraft position in terms of longitude and latitude involves the use of loran with specially prepared loran maps. The loran signals as received by the aircraft are converted to points on the map indicative of the latitude and longitude of the aircraft. In this method, an operator must determine the position of the aircraft on the map from the two loran readings and then determine latitude and longitude of the aircraft by means of scaling lines on the map. Needless to say, this method has the disadvantage of being time-consuming and requiring the time and attention of an operator. Other disadvantages of this method are in the time lag between receiving loran signals and determining the position of the aircraft. Furthermore, this method requires large working spaces for the loran maps as well as the preparation and carrying of the many maps necessary for world wide coverage.

This invention contemplates the automatic and continuous calculation of aircraft present position in terms of longitude and latitude utilizing loran signals from any particular triad.

The present invention contemplates a navigational computer which uses inputs of approximate longitude and latitude of an aircraft obtained from its dead reckoning equipment along with inputs from any specified loran triad and by utilizing spherical trigonometry the approximate aircraft position is corrected to provide an output giving highly accurate indications of the aircraft position in terms of longitude and latitude.

The estimated position of an aircraft flying in the vicinity of a loran triad fully defines an ellipse having as its foci the master station and one of the slave stations of the loran triad. At the same time the loran line of position associated with the loran signal from the loran triad fully defines a branch of a hyperbola in which the master station and the above-mentioned slave station are its foci. Therefore the ellipse and the hyperbola of this situation have common foci. If there were available some means for changing the longitude and latitude of the assumed longitude and latitude of the aircraft until it coincided with the longitude and latitude of the point at which the ellipse and hyperbola intersected, the resulting longitude and latitude would be a more correct indication of the aircraft position than that obtainable by dead reckoning techniques. If this process were repeated by alternating between the two loran lines of position associated with a loran triad, the successive corrected longitude and latitude of the aircraft would rapidly approach the intersection of the two loran lines of position which intersection is, of course, a highly accurate indication of actual aircraft position. In essence therefore, the computer of the present invention is used to convert the position of the aircraft as located by the two loran lines of position as received in signal form from the loran triad into a visual indication of actual aircraft position in terms of longitude and latitude of the aircraft without resort to intermediate steps, as for example, plotting position on a loran map and using available tables of conversion associated with each individual triad for obtaining longitude and latitude of the aircraft.

The computer of the present invention effectively converts signals received from a loran triad associated with an aircraft in the vicinity thereof to a visual and continuous indication of longitude and latitude of that aircraft which are as accurate as loran equipment permits.

Therefore it is an object of the present invention to provide a navigational computer system to provide an aircraft with automatic, continuous indications of its present longitude and latitude as accurate as the positional information obtainable from loran equipment.

Another object of the present invention is to provide a navigational computer system for converting loran signals into direct and continuous indications of the longitude and latitude of an aircraft without the need for maps and a special operator.

A further object of the present invention is to provide a navigational computer system for converting loran signals from an associated triad directly into continuous indications of aircraft longitude and latitude capable of use throughout the world wherever loran signals can now be received or may be available for reception in the future which has an accuracy equivalent to the maximum extent permitted by present or future developments in loran transmitting and receiving equipment.

Still another object of the present invention is to provide a navigational computer system for automatically calculating the aircraft longitude and latitude from loran readings without the use of loran maps or similar aids.

Yet another object of the present invention is to provide a navigational computer system for so rapidly converting loran readings to aircraft longitude and latitude that the aircraft position may be continuously plotted in longitude and latitude directly without the use of usual dead reckoning equipment.

Other objects and many of the attendant advantages of this invention will be readily appreciated as the same become better understood by reference to the following detailed description when considered in connection with the accompanying drawings.

FIGS. 1A and 1B illustrate in block diagram form the preferred embodiment of the invention.

Figure 2:
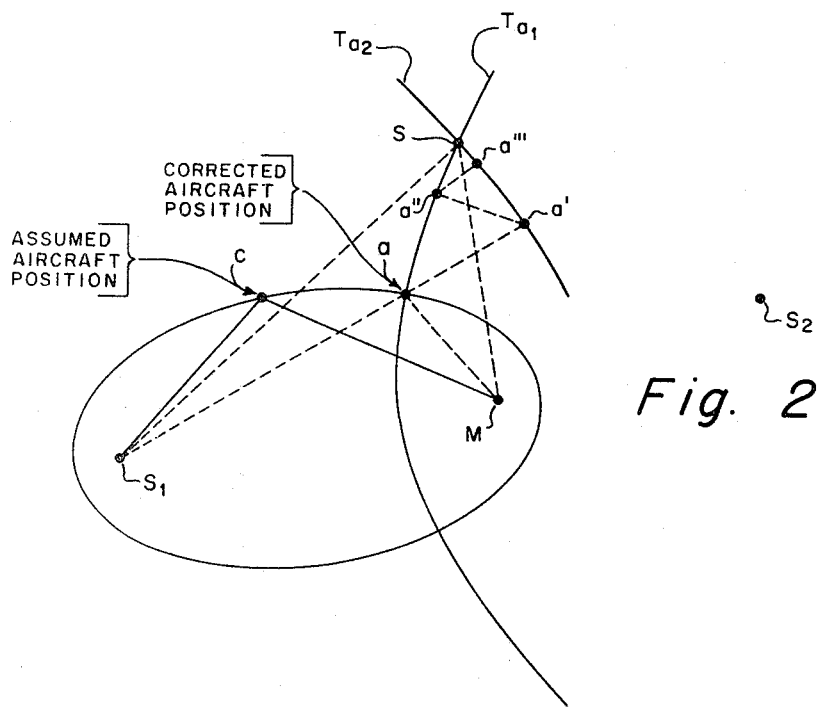
FIG. 2 illustrates in geometrical form the method by which the simultaneous equations are derived.

Referring more particularly to FIG. 2, there is shown in geometrical configuration the basic relationships which the computer of the present invention utilizes to provide an instantaneous and continuous indication of aircraft longitude and latitude.

Given the assumed aircraft position $c$, which assumed aircraft position may be obtained from the dead reckoning equipment normally present in an aircraft, the loran station positions $m$ and $s_1$, the actual loran line of position $Ta_1$, the corrected aircraft position $a$ resulting from moving the assumed aircraft position $c$ along a line perpendicular to loran line position $Ta_1$ can be mathematically determined by solution of the two equations based on the fundamental mathematical definition of ellipses and hyperboli having common foci at $m$ and $s_1$.

Slave station $s_2$, loran line of position $T_{a_2}$, and the intersection S of the two loran lines of position may be used in an iteration process of the present invention to obtain even more correct version of aircraft position $a$ as will be more fully explained hereinafter.

From the mathematical definition of the ellipse as defined in FIG. 2

$$Ds_1a + Dma = Ds_1c + Dmc$$

From the mathematical definition of the hyberbola as defined in FIG. 2

$$Ds_1a - Dma = Dss_1 - Dsm$$

By the simultaneous solution of these equations, the spherical distances $D°sa$ and $D°ma$ may be found. From these distances it is possible to determine the longitude $\varphi_a$ and latitude $\phi_a$ of the corrected aircraft position $a$. All the mathematical equations in their logical sequence used for determining the longitude and latitude of the corrected aircraft position $a$ are set forth in Table I.

Figure 1B:
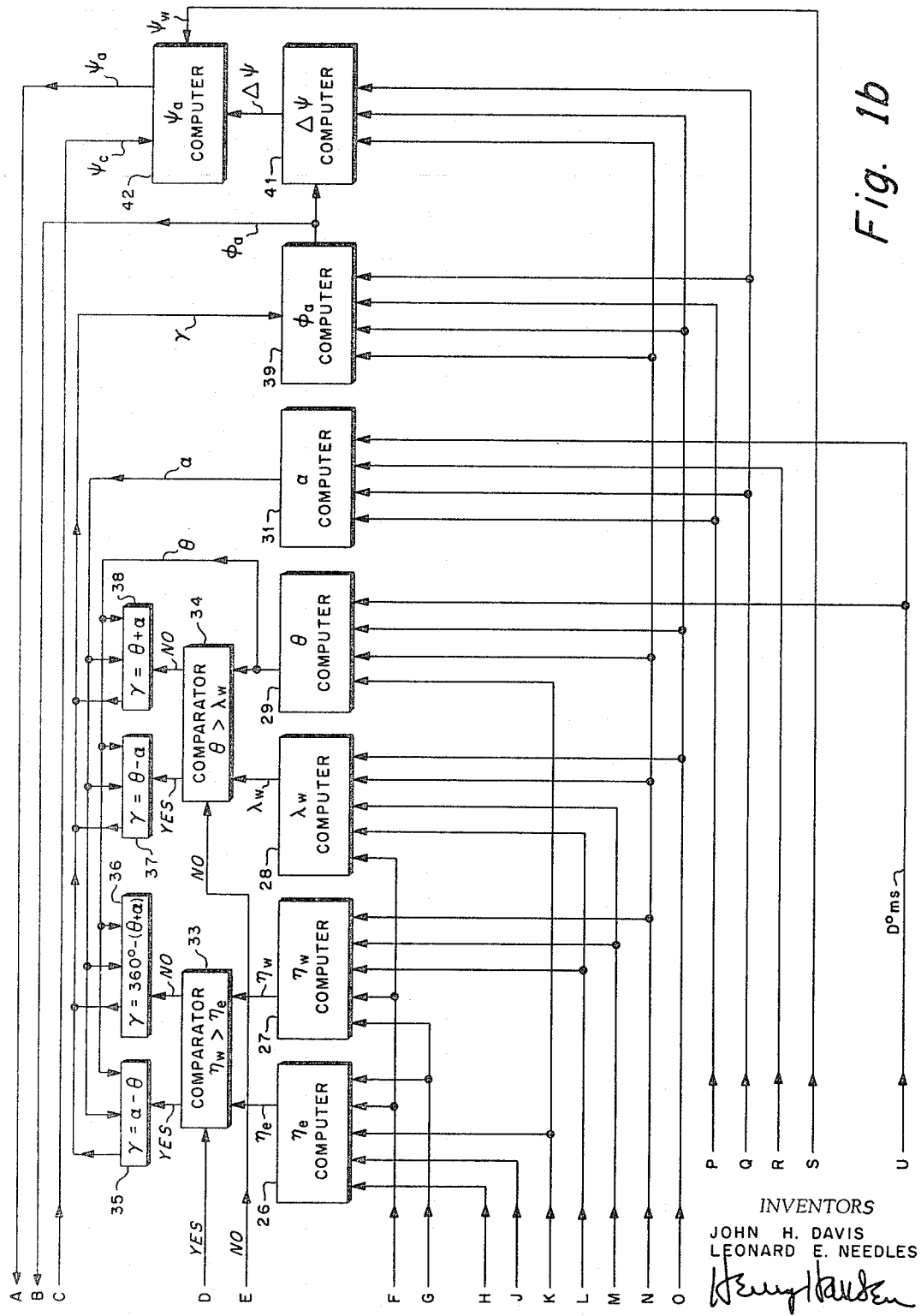

Referring now more particularly to FIGS. 1A and 1B, there is shown the navigational computer system of the present invention wherein the various inputs and outputs of each computer element are indicated.

The latitudes ($\phi_{s_1}$, $\phi_{s_2}$, $\phi_m$) and longitudes ($\psi_{s_1}$, $\psi_{s_2}$, $\psi_m$) of the loran stations along with the time constants ($\beta_1$, $\beta_2$, $\delta_1$, $\delta_2$) associated with these stations are set into the computer via switch 12 by means of the manual input controls 11. Also the latitude $\phi_c$ and longitude $\psi_c$ of an assumed or dead reckoned aircraft position $c$ are set into Lat-Long Indicator 13 of the computer by the manual input controls 11 and appear in numerical form on the Lat-Long Indicator 13. A value $\Delta_T$ representing the maximum error in microseconds expected from the mechanization of the loran concept is set into comparator 14 of the computer to be used as the criteria for ending the correction iterations as is more fully discussed hereinbelow.

The loran time values ($T_{a_1}$, $T_{a_2}$), received by automatic loran receiver 15 from the transmitters 16 of the loran stations, along with the latitudes and longitudes of the two slave stations and their associated time constants are fed to a five pole, double throw switch 12 which allows only the parameters associated with one of the slave stations and the master station to be passed on to the other parts of the computer system during any one iteration.

The resolver 18 receives the latitudes $\phi_c$ and longitudes $\psi_c$ of the assumed aircraft position, the master loran station, and the selected slave loran station and provides as outputs the sine and cosine functions as shown in the drawing of these latitudes and longitudes for later use in solving the required equations. The spherical distance $D°sc$ between the loran slave station and the assumed aircraft position is computed in the $D°sc$ computer 19 by Equation 1b as shown in Table I. The spherical distance $D°mc$ between the loran master station and the assumed aircraft position is computed in the $D°mc$ computer 21 by Equation 1a shown in Table I. These spherical distances ($D°sc$, $D°mc$) are fed to loran time computer 22 which computes a loran time value $Tc$ for the assumed aircraft position. This value $Tc$ is compared to the actual value $Ta$ in the comparator 14. If $$Ta + \Delta T \geq Tc \geq Ta - \Delta T$$

a switching signal is sent to switch 12 allowing the other set of parameters associated with the other slave station to be passed to the computer to initiate another iteration. If the above condition is not met, the switch 12 is not actuated and the original iteration is continued.

The spherical distances ($D°sc$, $D°mc$), the actual loran time value $Ta$, and the parameters $\beta$, $\delta$ associated with the slave station $S_1$ are fed to ellipse-hyperbola computer 23 where the spherical distances $D°sa$ and $D°ma$ from the loran stations to the corrected aircraft position on the hyperbolic loran line of position defined by $Ta$ are computed. The equations solved in this computer are 5a and 5b shown in Table I. The spherical baseline distance $D°ms$ is also computed in the ellipse-hyperbola computer 23 by solution of equation 4a as shown in Table I.

As best seen in FIGS. 1a and 1b, the sine and cosine functions of the latitudes of the master and slave stations; the sine and cosine functions of the spherical distances from the master and slave stations to the assumed aircraft and corrected aircraft positions; and the longitudes of the master and slave stations are fed to a 14 pole, double throw switch 44 which allows the input values to the switch to be passed on according to the orientation of the loran stations. The switching signal to accomplish this comes from comparator 43 which compares the longitudes $\psi_m$, $\psi_s$ of the loran stations to determine the more western of the two stations and thus determine the proper position for switch 44. In order to establish the more eastern and western of the slave and master station of the loran pair for any particular iteration, the longitudes of the master and slave stations are compared in comparator 43. If $\psi_m > \psi_s$, the master station is the more western of the loran pair in use for the particular iteration. If the above condition exists, all quantities associated with the master station are passed through switch 44 as western station quantities and the quantities associated with the slave station pass as eastern station quantities. If the above condition does not exist, all quantities associated with the master station are passed through switch 44 as eastern station quantities and the quantities associated with the slave station pass as western station quantities. This identification of the more eastern and western of the stations of the selected loran pair is necessary as a first step in establishing a mathematical convention whereby the same system of equations may be used without unduly multiplying the number of elements required by the combination of the present invention.

In order that the computer system function accurately regardless of the location of the aircraft with respect to the particular loran triad being used, it is necessary to be able to locate the aircraft relative to the baseline between the master station and the slave station. To do this, an assumption is made that the dead reckoned aircraft position $c$ is reasonably close to the actual aircraft position such that the general location of the dead reckoned position $c$ relative to the baseline will very probably define the location of actual aircraft position relative to the same baseline.

If the longitude of the dead reckoned aircraft position $c$ is less than the longitude of either or both stations of the loran pair, when the angle $\lambda_w$ which is the bearing of the great circle through position $c$ measured at the more western station of the loran pair must be computed. This angle is compared with the angle $\theta$ which is the angle between the base line and the meridian through the more western station of the loran pair measured at the more western station. If the angle $\theta$ is less than the angle $\lambda_w$, dead reckoned position $c$ and, according to the aforementioned assumption, aircraft position $a$ are below the base line. However, if the angle $\theta$ is greater than the angle $\lambda_w$, aircraft position $a$ is above the base line.

If the longitude of dead reckoned position $c$ is greater than the longitude of both stations of the loran pair, angles $\eta_w$ and $\eta_e$, which are the bearings of the two great circles through position $c$ and the more western and more eastern loran stations, respectively, measured at position $c$ must be computed. If $\eta_w$ is less than $\eta_e$, dead reckoned position $c$ and therefore according to the previous assumption, aircraft position $a$ is below the baseline. If $\eta_w$ is greater than $\eta_e$, aircraft position $a$ is above the baseline. The above mentioned comparisons are automatically carried out by the portion of the computer system as shown in FIG. 1b hereinafter more fully disclosed.

In the $\eta_e$ computer 26 the bearing angle $\eta_e$ of the great circle between the assumed aircraft position and the more eastern loran station measured at the assumed aircraft position is computed using Equation 7b as shown in Table I.

In the $\eta_w$ computer 27 the bearing angle $\eta_w$ of the great circle between the assumed aircraft position and the more western loran station measured at the assumed aircraft position is computed using Equation 7a as shown in Table I.

In the $\lambda_w$ computer 28 the bearing angle $\lambda_w$ of the great circle between the assumed aircraft position and the more western station measured at the more western station is computed using Equation 7c as shown in Table I.

In the $\theta$ computer 29 the bearing angle ($\theta$) of the baseline ($D°ms$), measured at the more western station is computed using Equation 4b as shown in Table I.

In the $\alpha$ computer 31 the angle $\alpha$ between the baseline and the great circle through the corrected aircraft position, point $a$, and the more western loran station measured at the more western station is computed using Equation 6 as shown in Table I.

In the comparator 32 the longitude $\psi_c$ of the assumed aircraft position is compared to the longitudes ($\psi_m$, $\psi_s$) of the two loran stations. If $\psi_m < \psi_c > \psi_s$, a switching signal is sent to the comparator 33 allowing the values of $\eta_e$ and $\eta_w$ to be compared therein at which time the values of $\lambda_w$ and $\theta$ are disregarded. If, however, the condition of $\psi_m < \psi_c > \psi_s$ is not met, comparator 32 provides comparator 34 with a switching signal to allow the values of $\lambda_w$ and $\theta$ to be compared at which time the values of $\eta_e$ and $\eta_w$ are disregarded.

If comparator 33 is actuated and the condition of $\eta_w > \eta_e$ is met, an angle $\gamma$ to be used later in the computation of the latitude of the corrected aircraft position $a$ is computed in computer 35. If the condition of $\eta_w > \eta_e$ is not met, angle $\gamma$ is computed by computer 36.

If comparator 34 is actuated and the condition of $\theta > \lambda_w$ is met, angle $\gamma$ is computed in computer 37. If the condition of $\theta > \lambda_w$ is not met, angle $\gamma$ is computed in computer 38.

The angle $\gamma$, which is the angle defined by the meridian of the great circle passing through the more western of the loran pair and the line connecting the more western station to the aircraft position $a$, is necessary for the solution of latitude of the aircraft position $\phi_a$ as solved in computer 39.

From one of the computers 35, 36, 37, or 38 the proper angle $\gamma$ is fed to $\phi_a$ computer 39 to provide as an output the latitude $\phi_a$ of the corrected aircraft position $a$. Computer 39 receiving the inputs as shown in the drawing solves Equation 8 shown in Table I.

Computer 41 computes the change in longitude from the more western loran station to the corrected aircraft position $a$ by solving Equation 9 as shown in Table I.

Computer 42 computes the longitude $\psi_a$ of the corrected aircraft position $a$ by carrying out the steps shown in Equation 10 of Table I.

The computed values of $\phi_a$ and $\psi_a$ are fed to the Lat-Long indicator 13 via timing switch 45 which allows the corrected values to enter the indicators during a time when there is no output from the indicators to the resolver 18. Timing switch 45 periodically opens the circuit carrying the assumed latitude and longitude values. During this period the computations take place based on the assumed position of the aircraft. When the period of computation is completed and corrected values of latitude and longitude are available to be fed to the indicator, the timing switch 45 closes the circuit carrying the corrected values and opens the circuit carrying the assumed values of latitude and longitude. This enables an updating of the Lat-Long indicator 13 without allowing erroneous computations to occur during the updating process.

The corrected aircraft position $a$ obtained from the navigational computer system of the present invention may have an accuracy suitable for many purposes. The preceding method has shown how the longitude $\psi_c$ and latitude $\phi_c$ of the aircraft position as obtained from dead reckoning or other equipment may be used with a loran master and slave station to find a more accurate aircraft position $a$ in terms of longitude $\psi_a$ and latitude $\phi_a$. However, the present invention provides for an even more accurate presentation of aircraft position simply by repeating the computing process employing the same master station $m$ in conjunction with the other slave station S2. Thus, instead of the longitude and latitude values of the slave station S1 being fed into resolver 18, switch 12 functions to feed the longitude and latitude of slave station S2 to resolver 18. The $\beta$ and $\delta$ terms associated with slave station S2 are fed into ellipse-hyperbola computer 23 instead of those associated with slave station S1. Further, the longitude and latitude of the first corrected aircraft position $a$ are used in place of the original assumed or approximate values of aircraft longitude and latitude obtained from the dead reckoning system within the aircraft. The mathematical process is then repeated and the Lat-Long indicator 13 then indicates longitude and latitude of a second corrected aircraft position $a'$. This second corrected aircraft position $a'$ is shown in FIG. 2. While this correcting iteration process can be repeated as often as desired, it is necessary to establish some criteria for determining when as accurate an estimate of position as possible has been made.

Since the accuracy of the present invention is limited only by the loran equipment, the criteria for stopping the iteration process should be established by the maximum error that may result from the loran equipment. The maximum error is determinable and is represented by $\Delta T$. Comparator 14 which has the maximum error $\Delta T$ set in also receives actual loran signal $Ta$ and calculated loran signal $Tc$. If $Ta = Tc$ within the limits of the maximum error $\Delta T$, switch 12 receives a signal preventing any further iteration and Lat-Long indicator 13 provides an indication of aircraft position as accurate as the loran equipment permits.

Obviously, many modifications and variations of the present invention are possible in the light of the above teachings. It is, therefore, to be understood that within the scope of the appended claims the invention may be practiced otherwise than as specifically described.

*Table I*

(1) a. $D°_{mc} = \text{arc cos } [\sin \phi_m \sin \phi_c + \cos \phi_m \cos \phi_c \cos (\psi_m - \psi_c)]$ b. $D°_{sc} = \text{arc cos } [\sin \phi_s \sin \phi_c + \cos \phi_s \cos \phi_c \cos (\psi_s - \psi_c)]$ (2) $T_c = \beta + \delta + (D°_{sc} - D°_{mc}) K_p$ (3) $(T_a + \Delta T) \geq T_c \geq (T_a - \Delta T)$

| YES | NO |
|---|---|
| Change to other slave station and begin again at step 1b. | Proceed to step 4. |

(4) a. $D°_{ms} = \text{arc cos } [\sin \phi_m \sin \phi_s + \cos \phi_m \cos \phi_s \cos (\psi_m - \psi_s)]$ b. $\theta = \text{arc cos} \left[ \dfrac{\sin \phi_c - \sin \phi_w \cos D°_{ms}}{\cos \phi_w \sin D°_{ms}} \right]$ (5) a. $D°_{sa} = \frac{1}{2}\left[D°_{sc} + D°_{mc} + (T_a - \beta - \delta)\left(\frac{1}{K_p}\right)\right]$ b. $D°_{ma} = \frac{1}{2}\left[D°_{sc} + D°_{mc} - (T_a - \beta - \delta)\left(\frac{1}{K_p}\right)\right]$ (6) $\alpha = \text{arc cos}\left[\frac{\cos D°_{ea} - \cos D°_{ms} \cos D°_{wa}}{\sin D°_{ms} \sin D°_{wa}}\right]$ (7) $\psi_m < \psi_c > \psi_s$

| YES | NO |
|---|---|
| a. $\eta_w = \text{arc cos}\left[\frac{\sin \phi_w - \sin \phi_c \cos D°_{wc}}{\cos \phi_c \sin D°_{wc}}\right]$ | c. $\lambda_w = \text{arc cos}\left[\frac{\sin \phi_c - \sin \phi_w \cos D°_{wc}}{\cos \phi_w \sin D°_{wc}}\right]$ |
| b. $\eta_e = \text{arc cos}\left[\frac{\sin \phi_e - \sin \phi_c \cos D°_{ec}}{\cos \phi_c \sin D°_{ec}}\right]$ | |

| $\eta_w > \eta_e$ | | $\theta > \lambda_w$ | |
|---|---|---|---|
| YES | NO | YES | NO |
| $\gamma = \alpha - \theta$ | $\gamma = 360° - (\alpha + \theta)$ | $\gamma = \theta - \alpha$ | $\gamma = \theta + \alpha$ |

(8) $\phi_a = 90° - \text{arc cos}[\sin \phi_w \cos D°_{wa} + \cos \phi_w \sin D°_{wa} \cos \gamma]$ (9) $\Delta\psi = \text{arc cos}\left[\frac{\cos D_{wa} - \sin \phi_a \sin \phi_w}{\cos \phi_a \cos \phi_w}\right]$

(10) $\psi_w > \psi_c$

| YES | NO |
|---|---|
| $\psi_a = \psi_w - \Delta\psi$ | $\psi_a = \psi_w + \Delta\psi$ |

What is claimed is:

1. A navigation computer system for use in an aircraft, comprising in combination:

first computer means computing the spherical distance between one of the slave stations of a loran triad and an assumed position of the aircraft, second computer means computing the spherical distance between the master station of the loran triad and the assumed position of the aircraft, loran receiver means receiving loran signals from the loran triad, means comparing the computed distances of said first and second computer means with the signals from said loran receiver means for enabling said first computer means to compute the spherical distance between the other of said slave stations of the loran triad with the assumed position of the aircraft if the comparison is within a predetermined error, ellipse-hyperbola computer means connected to said first and second computer means and said loran receiver means computing the sine and cosine function of the spherical distances between the master station of the loran triad and the position of the aircraft and the selected slave station of the loran triad and the position of the aircraft.

2. A navigational computer system for use in an aircraft for automatically converting loran signals into the longitude and latitude of the aircraft, comprising in combination:

first computer means computing the spherical distance between one of the slave stations of a loran triad and an assumed position of the aircraft, second computer means computing the spherical distance between the master station of the loran triad and the assumed position of the aircraft, loran receiver means receiving loran signals from the loran triad, means comparing the computed distances of said first and second computer means with the signals from said loran receiver means for enabling said first computer means to compute the spherical distance between the other of said slave stations of the loran triad with the assumed position of the aircraft if the comparison is within a predetermined error, ellipse-hyperbola computer means connected to said first and second computer means and said loran receiver means computing the sine and cosine function of the spherical distances between the master station of the loran triad and the position of the aircraft and the selected slave station of the loran triad and the position of the aircraft, third computer means connected to said ellipse-hyperbola computer means converting said spherical distances between the master station of the loran triad and the position of the aircraft and the selected slave station of the Loran triad and the position of the aircraft into the longitude and latitude of the position of the aircraft.

3. A navigational computer system for use in an aircraft for automatically converting loran signals into visual indications of the longitude and latitude of the aircraft, comprising in combination:

first computer means computing the spherical distance between one of the slave stations of a loran triad and an assumed position of the aircraft, second computer means computing the spherical distance between the master station of the loran triad and the assumed position of the aircraft, loran receiver means receiving loran signals from the loran triad, means comparing the computed distances of said first and second computer means with the signals from said loran receiver means for enabling said first computer means to compute the spherical distance between the other of said slave stations of the loran triad with the assumed position of the aircraft if the comparison is within a predetermined error, ellipse-hyperbola computer means connected to said first and second computer means and said loran receiver means computing the sine and cosine function of the spherical distances between the master station of the loran triad and the position of the aircraft and the selected slave station of the loran triad and the position of the aircraft, third computer means connected to said ellipse-hyperbola computer means converting said spherical distances between the master station of the loran triad and the position of the aircraft and the selected slave station of the loran triad and the position of the aricraft into the longitude and latitude of the position of the aircraft, latitude-longitude indicator means providing visual indications of the longitude and latitude of the aircraft, input means providing said latitude-longitude indicator means with inputs the approximate longitude and latitude of the aircraft, means connecting said third computer means to said latitude-longitude indicator means whereby the visual indications of approximate longitude and latitude of the aircraft are corrected to the longitude and latitude of the aircraft computed by said third computer means.

4. A navigational computer system for use in an aircraft comprising in combination:

first computer means computing the spherical distance between one of the slave stations of a loran triad and an assumed position of the aircraft, second computer means computing the spherical distance between the master station of the loran triad and the assumed position of the aircraft, loran receiver means receiving loran signals from the loran triad, loran time computer means connected to said first and second computer providing as an output a computed loran time, comparator means connected to said loran receiver means and said loran time computer means providing an output if the computed loran time equals actual loran time within a predetermined error, switch means connected between said comparator means and said first computer whereby said first computer means computes the spherical distance between the other of said slave stations of loran triad and the assumed position of the aircraft when said comparator means has an output, ellipse-hyperbola computer means connected to said first and second computer means and said loran receiver means computing the sine and cosine function of the spherical distances between the master station of the loran triad and the position of the aircraft and the selected slave station of the loran triad and the position of the aircraft.

5. A navigational computer system for use in an aircraft comprising in combination:

first computer means computing the spherical distance between one of the slave stations of a loran triad and an assumed position of the aircraft, second computer means computing the spherical distance between the master station of the loran triad and the assumed position of the aircraft, loran receiver means receiving loran signals from the loran triad, ellipse-hyperbola computer means connected to said first and second computer means and said loran receiver means computing the sine and cosine function of the spherical distances between the master station of the loran triad and the position of the aircraft and the selected slave station of the loran triad and the position of the aircraft, loran time computer means connected to said first and second computer means providing as an output a computed loran time, comparator means connected to said loran receiver means and said loran time computer means providing an output if the computed loran time equals actual loran time within a predetermined error, switch means connected between said comparator means and said first computer means and said first computer whereby said first computer means computes the spherical distance between the other of said slave stations of the loran triad and the assumed position of the aircraft when said comparator means has an output, third computer means connected to said ellipse-hyperbola computer means converting said spherical distances between the master station of the loran triad and the position of the aircraft and the selected slave station of the loran triad and the position of the aircraft into the longitude and latitude of the position of the aircraft.

6. A navigational computer system for use in an aircraft, comprising in combination:

first computer means computing the spherical distance between one of the slave stations of a loran triad and an assumed position of the aircraft, second computer means computing the spherical distance between the master station of the loran triad and the assumed position of the aircraft, loran receiver means receiving loran signals from the loran triad, ellipse-hyperbola computer means connected to said first and second computer means and said loran receiver means computing the sine and cosine function of the spherical distances between the master station of the loran triad and the position of the aircraft and the selected slave station of the loran triad and the position of the aircraft, loran time computer means connected to said first and second computer means providing as an output a computed loran time, comparator means connected to said loran receiver means and said loran time computer means providing an output of the computed loran time equals actual loran time with a predetermined error, switch means connected between said comparator means and said first computer whereby said first computer means computes the spherical distance between the other of said slave stations of the loran triad and the assumed position of the aircraft when said comparator means has an output, third computer means connected to said ellipse-hyperbola computer means converting said spherical distances between the master station of the loran triad and the position of the aircraft and the selected slave station of the loran triad and the position of the aircraft into the longitude and latitude of the position of the aircraft, latitude-longitude indicator means providing visual indications of the longitude and latitude of the aircraft, input means providing said latitude-longitude indicator means with inputs the approximate longitude and latitude of the aircraft, means connecting said third computer means to said latitude-longitude indicator means whereby the visual indications of approximate longitude and latitude of the aircraft are corrected to the longitude and latitude of the aircraft computed by said third computer means.

7. A navigational computer system for use in an aircraft comprising in combination:

resolver means, input means connected to said resolver means providing said resolver means with inputs proportional to the longitude and latitude of aircraft assumed position and of master station position of a loran triad, switch means connected to said resolver means providing said resolver means with inputs proportional to one or the other slave station positions of the loran triad, first computer means connected to said resolver means receiving inputs proportional to the sine and cosine functions of the longitude and latitude of said one slave station position and said aircraft assumed position providing an output proportional to the spherical distance between said aircraft assumed position and said one slave station position, second computer means connected to said resolver means receiving inputs proportional to the sine and cosine functions of the longitude and latitude of said master station position and said assumed aircraft position providing an output proportional to the spherical distance between said aircraft assumed position and said master station position, third computer means connected to said switch means and said first and second computer means receiving inputs proportional to the time constants of said one slave station position and the outputs from said first and second computer means computing the sine and cosine function of the spherical distances between said master station position and actual aircraft position and said one slave station position and actual aircraft position.

8. A navigational computer system for use in an aircraft comprising in combination:
   resolver means,
   input means connected to said resolver means providing said resolver means with inputs proportional to the longitude and latitude of aircraft assumed position and of master station position of a loran triad,
   switch means connected to said resolver means providing said resolver means with inputs proportional to one or the other slave station positions of the loran triad,
   first computer means connected to said resolver means receiving inputs proportional to the sine and cosine functions of the longitude and latitude of said one slave station position and said aircraft assumed position providing an output proportional to the spherical distance between said aircraft assumed position and said one slave station position,
   second computer means connected to said resolver means receiving inputs proportional to the sine and cosine functions of the longitude and latitude of said master station position and said assumed aircraft position providing an output proportional to the spherical distance between said aircraft assumed position and said master station position,
   third computer means connected to said switch means and said first and second computer means receiving inputs proportional to the time constants of said one slave station position and the outputs from said first and second computer means computing the sine and cosine function of the spherical distances between said master station position and actual aircraft position and said one slave station position and actual aircraft position,
   fourth computer means connected to said third computer means converting said spherical distances between said master position and said actual aircraft position and said one slave station position and said actual aircraft position into longitude and latitude of said actual aircraft position,
   latitude-longitude indicator means connected between said fourth computer means and said resolver means providing visual indications of longitude and latitude of actual aircraft position.

9. A navigational computer system for use in an aircraft comprising in combination:
   resolver means,
   input means connected to said resolver means providing said resolver means with inputs proportional to the longitude and latitude of aircraft assumed position and of master station position of a loran triad,
   switch means connected to said resolver means providing said resolver means with inputs proportional to one or the other slave station positions of the loran triad,
   first computer means connected to said resolver means receiving inputs proportional to the sine and cosine functions of the longitude and latitude of said one slave station position and said aircraft assumed position providing an output proportional to the spherical distance between said aircraft assumed position and said one slave station position,
   second computer means connected to said resolver means receiving inputs proportional to the sine and cosine functions of the longitude and latitude of said master station position and said assumed aircraft position providing an output proportional to the spherical distance between said aircraft assumed position and said master station position,
   third computer means connected to said switch means and said first and second computer means receiving inputs proportional to the time constants of said one slave station position and the outputs from said first and second computer means computing the sine and cosine function of the spherical distances between said master station position and actual aircraft position and said one slave station position and actual aircraft position,
   fourth computer means connected to said third computer means converting said spherical distances between said master position and said actual aircraft position and said one slave station position and said actual aircraft position into longitude and latitude of said actual aircraft position,
   latitude-longitude indicator means connected between said fourth computer means and said resolver means providing visual indications of longitude and latitude of actual aircraft position,
   loran receiver means receiving loran signals from the loran triad connected to said switch means,
   loran time computer means connected to said first and second computer means providing as an output a computed loran time,
   comparator means connected to said loran time computer means and said switch means providing a switching signal to said switch means when the computed loran time equals actual loran time within a predetermined error whereby said resolver means receives the longitude and latitude of said other slave station position as inputs and said third computer receives the time constants associated with said other slave station position as inputs.

10. A navigational computer system according to claim 8 wherein said fourth computer means further comprises:
    first angle computer means connected to said third computer means and said resolver means computing the angle between the line connecting said master station position to said one slave station position and the meridian through a predetermined one of said loran stations,
    second angle computer means connected to said third computer means computing the angle between the line connecting said master station position to said one slave station and the great circle between actual aircraft position and said predetermined one of said loran stations,
    third angle computer means connected to said first and second angle computer means providing an output proportional to the difference between the outputs from said first and second angle computer means,
    latitude computer means connected to said third computer means, said third angle computer means, said resolver means and said latitude-longitude indicator means,
    longitude computer means connected to said latitude computer means, said third computer means, said resolver means, and said latitude-longitude indicator means whereby said latitude-longitude indicator means provides continuous visual indications of actual aircraft position.

11. A navigational computer system according to claim 9 wherein said fourth computer means further comprises:
    first angle computer means connected to said third computer means and said resolver means computing the angle between the line connecting said master station position to said one slave station position and the meridian through a predetermined one of said loran stations,
second angle computer means connected to said third computer means computing the angle between the line connecting said master station position to said one slave station and the great circle between actual aircraft position and said predetermined one of said loran stations,
third angle computer means connected to said first and second angle computer means providing an output proportional to the difference between the outputs from said first and second angle computer means,
latitude computer means connected to said third computer means, said third angle computer means, said resolver means and said latitude-longitude indicator means,
longitude computer means connected to said latitude computer means, said third computer means, said resolver means, and said latitude-longitude indicator means whereby said latitude-longitude indicator means provides continuous visual indications of actual aircraft position.

References Cited by the Examiner

UNITED STATES PATENTS

| | | | |
|---|---|---|---|
| 3,020,545 | 2/1962 | Losher | 235—150.272 |
| 3,070,796 | 12/1962 | Gray | 235—150.272 |

MALCOLM A. MORRISON, *Primary Examiner.*

A. J. SARLI, *Assistant Examiner.*